United States Patent [19]

Doroszkowski et al.

[11] Patent Number: 4,999,091

[45] Date of Patent: Mar. 12, 1991

[54] COATING PROCESS AND COMPOSITION

[75] Inventors: Andrew Doroszkowski, Marlow; Michael A. Toynton; Peter Butler, both of Maidenhead, all of England

[73] Assignee: Imperial Chemical Industries PLC, London, England

[21] Appl. No.: 369,937

[22] Filed: Jun. 22, 1989

[30] Foreign Application Priority Data

Jul. 6, 1988 [GB] United Kingdom ............... 8816057
Mar. 17, 1989 [GB] United Kingdom ............... 8906199

[51] Int. Cl.$^5$ .......................... C25D 5/00; C25D 13/06
[52] U.S. Cl. .................................. 204/14.1; 204/181.7
[58] Field of Search ................... 204/14.1, 23, 181.7

[56] References Cited

U.S. PATENT DOCUMENTS

| 4,210,506 | 7/1980 | Hoppe ............................ 204/181.7 |
| 4,797,183 | 1/1989 | Yamamoto ...................... 204/55.1 |

FOREIGN PATENT DOCUMENTS

| 200397 | of 0000 | European Pat. Off. . |
| 0109760 | 5/1988 | European Pat. Off. . |
| 1032899 | 6/1966 | United Kingdom . |
| 1178741 | 1/1970 | United Kingdom . |
| 1331529 | 9/1973 | United Kingdom . |
| 1366823 | 9/1974 | United Kingdom . |
| 1511109 | 5/1978 | United Kingdom . |
| 1534655 | 12/1978 | United Kingdom . |
| 1580291 | 12/1980 | United Kingdom . |
| 2125808 | 3/1984 | United Kingdom . |
| 2130218 | 5/1984 | United Kingdom . |
| 2153259 | 8/1985 | United Kingdom . |

*Primary Examiner*—T. M. Tufariello
*Attorney, Agent, or Firm*—Cushman, Darby & Cushman

[57] ABSTRACT

A process for coating an article simultaneously with a metal and a film-forming polymer which comprises passing an electric current at a current density of 1 to 35 milliamps cm$^{-2}$ between the article as a cathode and a counter-electrode immersed in an aqueous coating composition having an inherent pH of 2.5 to 9.5, comprising:

(a) a dispersion in an aqueous carrier of film-forming polymer having steric stabilizing units and being free from ionic stabilizing units the dispersion being one which has a critical coalescence value more negative than −0.3 units and (b) at least 0.06% by weight based on the total composition of one or more zinc, cadmium, cobalt, iron, lead or nickel salts such that the dispersion has a critical coalescence temperature of 35° to 90° C.

11 Claims, No Drawings

COATING PROCESS AND COMPOSITION

This invention relates to a process for coating a conductive substrate by electrodeposition, to a coating composition useful in the process and to its preparation.

More particularly the invention relates to a process for coating a conductive substrate simultaneously with both a metal and film-forming polymer.

Certain organic coating materials deposit from aqueous dispersion on to an electrode when an electric current is passed between that electrode and a counter electrode immersed in the dispersion.

Published European Patent Application number 200 397, for example, discloses deposition of certain cationically stabilised polymers from aqueous dispersion on to a cathodic substrate.

Another type of composition is disclosed in British Patent No. 2130218 which describes cathodic deposition of certain non-ionically stabilised polymers from aqueous dispersions.

In these previous electropainting processes the deposition of the polymer is controlled by means of regulating the voltage applied between the electrode and the counter electrode. Typically this voltage is held at a constant value between 100 and 350 volts.

The deposition of metals from salt solutions onto a cathode by the passage of an electric current is known. Often the metal is used to form a protective coating on a metal article prone to corrosion. The process is called "electroplating". Probably the best known example of this process is the deposition of zinc in electrogalvanising steel.

In electroplating processes the deposition of metal is carried out with control of the current density at the cathode, but at relatively low voltages.

Processes apparently involving deposition of a metal and a polymer are known. Russian Patent No. 686,497 discloses the co-deposition of zinc or cadmium metal with a phenol formaldehyde resin containing amino and carboxyl groups. Polyakova, et al. in Lakokras. Mat. 1980(5) 29–31, describe the co-precipitation of caprolactam oligomers with zinc or cadmium.

British Patent No. 1469068 appears to disclose a process involving the cathodic co-deposition of metals and cationically stabilised solid polymer particles from dispersions. However, first of all, it appears in some cases this occurs not as a result of passage of current but as a result of a difference in position in the electrochemical series. Second, the amount of metal in the dispersions is relatively small. So it is unclear whether any significant quantity of metal is desposited if any is deposited at all. This is particularly so as the method of deposition is controlled electrically using an overvoltage. This, in combination with such low metal levels tends to confirm insignificant deposition of metal with polymer.

According to the present invention there is provided a process for coating an article simultaneously with a metal and a film-forming polymer which comprises passing an electric current at a current density of 1 to 35 milliamps cm$^{-2}$ between the article as a cathode and a counter-electrode immersed in an aqueous coating composition having an inherent pH of 2.5 to 9.5, comprising;

(a) a dispersion in an aqueous carrier of a film-forming polymer having steric stabilising units and being free of ionic stabilising units, the dispersion being one which has a critical coalescence value more negative than −0.3 units, and (b) at least 0.06% by weight based on the total composition of one or more zinc, cadmium, cobalt, iron, lead or nickel salts such that the dispersion has a critical coalescence temperature of 35° to 95° C.

As compared with BP 1469068 the process of this invention uses aqueous coating compositions which contain higher amounts of metal ions. As a result of the presence of higher levels of metal ions in the coating composition, higher levels of metal can be deposited on the substrate article together with the film forming polymer. This increased quantity of metal gives rise to improved corrosion protection of the substrate. Further, the process unlike that described in BP 1469068, is regulated by current control. In BP 1469068 there is voltage control.

The invention also provides a composition for use in the process of the invention, the composition comprising;

(a) an aqueous dispersion of a film-forming polymer having steric stabilising units and being free from ionic stabilising units, the dispersion being one which has a critical coalescence value more negative than −0.3 units, and (b) at least 0.06% by weight based on the total composition of one or more water soluble zinc, cadmium, cobalt, iron, lead or nickel salts such that the dispersion has a critical coalescence temperature of 35° to 95° C.

One property of these compositions is that they have a conductivity of 500 to 80,000 microSiemens per cm. Preferably they have a conductivity between 2000 and 70000 microsiemens per cm, more preferably between 5000 and 50000 microsiemens per cm.

The compositions according to this invention have an inherent pH in the range pH 2.5 to 9.5. That is to say, the aqueous dispersion of sterically stabilised film-forming polymer and metal salt has a pH in this range in the absence of buffer. The compositions are used in the process of this invention without buffering.

Preferably the pH of the composition is 3.5 to 9 particularly pH 4 to 7.

The metal salt can be any water soluble simple salt or co-ordination compound of zinc, nickel, cadmium, cobalt, iron or lead.

The simple salt can be either an inorganic or an organic salt. Where it is an inorganic salt, it can be a cyanide, chloride, sulphate or nitrate particularly a chloride. Where it is an organic salt, it can be a substituted or unsubstituted $C_{1-6}$ alkanoic acid for example a formate, acetate, chloroacetate, dichloroacetate, trichloroacetate or lactate, or it can be a di- acid for example a phthalate or maleate.

Preferably it is an acetate.

Complex salts can be formed with ammonia, cyanide, ethylenediamine, tartaric or citric acid and ethylenediaminetetraacetic acid (EDTA), particularly EDTA.

In particular the salt is a zinc, cobalt, cadmium, nickel or lead salt, particularly a zinc salt, or a mixture of zinc and cobalt salts.

In any particular case, the salt is chosen such that the composition is stable under usual application conditions for the deposition of a non-ionic sterically stabilised film-forming polymer at the concentrations of salt and polymer required to give the desired levels of metal and polymer in the film. By stable is meant that the dispersion does not coalesce in the bulk under standard application conditions. In particular it should be stable under standard application temperatures in the range 5°–50° C.

Generally the level of metal in the film after it has cured is 3 to 90% by weight of the film. Preferably it is 5 to 80% and more preferably it is 5 to 75% by weight.

In practice the salt is selected so as to obtain particular properties such as corrosion resistance in the co-deposited metal and resin coating and to obtain certain properties in the aqueous coating composition, such as the correct critical coalescence temperature.

The presence of metal salt in the dispersion of film-forming polymer depresses the critical coalescence temperature (cct) of the dispersion. The extent of the depression in cct is proportional to concentration of the salt. However, the extent of cct depression for any given concentration is dependent on the specific salt that is present. For example, metal phosphate salts depress the cct of a dispersion to a much greater extend than the same molar amount of metal sulphate salts. Similarly, metal sulphates depress the cct of a dispersion to a greater extent than an equal molar amount of metal chloride.

Thus, the upper concentration limit of the salt is that quantity of salt which when added to the emulsion, will depress the cct of the dispersion from its original value to a cct of 35° C.

It is possible in certain circumstances to use up to 10% metal ion by weight of total composition, for example when using zinc nitrate, but it is more likely to be less than 7% metal ion and even more likely that the concentration will be less than 6% metal ion.

A preferred lower limit of salt concentration is 0.1% by weight of the total composition, and a more preferred lower limit is 0.2%.

In practice, the dispersion contains from 5 to 45% by weight of film-forming polymer, preferably from 7 to 35% by weight, and more preferably from 10% to 25% by weight, based on the total weight of the dispersion.

The film-forming polymer is one that is in the form of a sterically stabilised dispersion being free from stabilising ionic units as distinct from ionically stabilised dispersion. A sterically stabilised dispersion is one where dispersed particles of polymer are stabilised by hydrophilic polymer chains which extend outwardly from the particle and are solvated by the aqueous medium so as to form a solvated layer around the particle.

By "free from ionic stabilising units" we mean that dispersions are stabilised by steric stabilisation and that if any ionic charges are present on the polymer particles than they are not essential to the stability of the dispersion.

Sterically stabilized dispersions free from ionic stabilising units can be distinguished from ionically stabilized dispersion by the fact that sterically stabilised dispersion have a critical coalesence temperature.

The sterically-stabilised dispersion of film-forming polymer is selected having regard to the critical coalescence value.

Critical coalescence value is measured by the following test.

A polymer dispersion in water is prepared in a small beaker at 10% by weight of disperse polymer phase based on the total weight of the dispersion and at the optimum pH for stability. A magnetic bead is placed inside the beaker so that gentle stirring may be achieved when using a magnetic hot plate device. The small beaker is surrounded by a large beaker of water which acts as a water bath to ensure even heating by the magnetic hot plate device beneath it. A thermometer is placed in the dispersion and heat is applied so that the temperature of the dispersion is gradually increased from the ambient temperature by about 1° C. per minute with gentle stirring. The temperature at which coalescence of the dispersion is clearly detectable by eye is noted, and this is recorded as the critical coalescence temperature (c.c.t.) in degrees absolute (K). Values of c.c.t. are determined for the dispersion at various pH values in the region 8 to 13 by adjustment of the pH with alkali. The critical coalescence value (c.c.v.) is calculated from the relationship $$c.c.v = \frac{20.d(c.c.t.)}{A.d(\text{pH})}$$

where A is the c.c.t. at pH 12 in degrees Kelvin (°K.), and $d(c.c.t.)/d(\text{pH})$ is the slope of the c.c.t./pH plot at pH 12.

Suitable film-forming polymers for the present process are those which have a c.c.v. more negative that $-0.3$ units.

Steric stabilisation of the film forming polymer is achieved by a steric stabiliser having a polymeric nonionic hydrophilic unit, and a linking component.

The linking component may be one of two distinct types. The linking component may be a unit which associates with the film-forming polymer but does not react with it. Steric Stabilisers having this type of linking component are known as associative stabilisers. Alternatively, the linking unit may be a unit which reacts with the film-forming polymer.

Steric stabilisers having this type of linking component are referred to as reactive stabilisers. Associative stabilisers may be in the form of block or graft copolymers.

Preferably the steric stabiliser is a reactive stabiliser.

The hydrophilic unit may be derived from these polymers as such, or from their monoalkyl ethers, in which the terminal alkyl group contains 1–4 carbon atoms. The molecular weight of such hydrophilic units is between 600 and 4,000, preferably it is between 800 and 3,000, more preferably it is between 1,000 and 2,500, and particularly is approximately 2000.

Other suitable polymers from which the hydrophilic unit may be derived include those comprising both oxyethylene units and different oxyalkylene units, for example poly(ethylene oxide)-poly)polypropylene oxide) copolymers in which there is present at least 40% of ethylene oxide. Preferably there is at present at least 60%, more preferably 85% of ethylene oxide in the copolymer.

The number of hydrophilic units which are to be present in the film-forming polymer in order to achieve a stable dispersion, from which deposition may be caused to occur, will clearly depend upon such variables as the nature of the polymer and the number of oxyethylene units in the hydrophilic unit. The proportion of repeating oxyethylene units in the total film-forming polymer is determined by the molecular weight of such units in each moiety and by the number of distinct hydrophilic units which are present.

Preferably, the molecular weight of the repeating oxyethylene units in each hydrophilic unit is greater than 500 and the total content of repeating oxyethylene units in the film-forming polymer is preferably in the range 1–60% by weight. However, the precise selection of a suitable film-forming polymer must be guided by the result of the test procedure described above for determining the critical coalescence value.

Where the steric stabiliser is a reactive stabiliser for a condensation polymer or a polyepoxide, linking is achieved by reactive a glycol, poly(ethyleneoxide), poly(propylene oxide) or a monoether thereof or an amine or carboxylic acid derivative thereof with the condensation polymer during its formation or with the polyepoxide.

In these circumstances the linking component is, in the case of an epoxide a covalent bond, a primary or secondary amine group or a carboxyl group or in the case of a polyester is an ester or an amide moiety.

Where the polymer is an acrylate, the steric stabiliser may be incorporated into the polymer by polymerising an acrylate or methacrylate of the corresponding polyethylene glycol or corresponding co-polymer.

An example of such acrylate derivatives are compounds of general formula (1):

$$CH_2=CH.CO.O(C_4H_8O)_y(C_2H_4O)_xOCH_3 \quad (1)$$

where x and y have values corresponding to molecular weight for the poly(oxyethylene) and poly(oxybutylene) blocks of 2,000 and 7,000 respectively. This substance is readily obtained by condensing methanol with ethylene oxide and subsequently with butylene oxide in the requisite proportions, and then reacting the product with methacryl chloride, or carrying out an ester interchange reaction between the product and methyl methacrylate in the presence of a catalytic amount of tetraisopropyl titanate.

Another class of acrylate derivatives has the general formula (2:

$$CH_3O(C_2H_4O)_x(C_4H_8O)_y CO.\overset{CH_3}{\underset{|}{C}}=CH_2 \quad (2)$$

where x and y have the same value as above.

Preferably, where the film forming polymer is an acrylate, the stabilising unit is derived from a compound of formula (1) or (2) where y is zero and x is from 11 to 90 and especially from 33 to 66.

Sterically stabilised dispersion of non-ionic film-forming polymers derived from precursors of this type can be prepared as described in British Paten Specifications Nos. 2124636A and 2127835A.

Suitable types of film-forming polymer which can be sterically stabilised include the synthetic addition polymers and copolymers and condensation polymers. Specific chemical types of polymer includes epoxy resins, alkyd resins, polyurethane resins, acrylic resins and polyester resins.

One class of suitable film-forming polymers are the epoxy resins. These epoxy resins can be reacted, for example through an epoxide group, with other materials in order to modify their deposition and other characteristics. In one instance, an epoxy resin may be reacted with a polycaprolactone diol and in another instance the epoxy resin may be reacted with a polyether. We have also found that the deposition characteristics of the epoxy resin-based polymers may be improved when free epoxide groups are esterified, preferably with benzoic acid or a substituted benzoic acid. In another instance, the epoxy resin may be modified by grafting to it an addition polymer.

Within this class, preferably the film forming polymer is an "advanced" or chain extended polyepoxide which can be represented by the idealised structural formula (3)

$$\underset{OH}{Ep\text{------}O\text{---}Pol\text{---}O\text{------}Ep} \quad (3)$$

where Ep is the residue of an epoxide of formula (4):

$$CH_2\text{---}\overset{O}{\overset{\diagup\diagdown}{CH}}\text{---}\left[O\text{-}\bigcirc\text{-}\bigcirc\text{-}OCH_2\underset{\underset{OH}{|}}{CH}\text{---}CH_2\right]_p\text{---}O\text{-}\bigcirc\text{-}\bigcirc\text{-}OCH_2\text{---}\overset{O}{\overset{\diagup\diagdown}{CH}}\text{---}CH_2 \quad (4)$$

where p is a number such that the epoxide Ep has an epoxide equivalent in the range 150 to 2500 and Pol is the residue of an organic polyol.

Preferably the epoxide Ep has an equivalent weight of 450 to 2,000.

Polyepoxides of this type are available under the Trade Mark "Epikote", in particular Epikote 828, 1001, 1004 and 1007. Preferably it is Epikote 1001.

The polyol or diol can be a simple $C_{2-18}$ alkene diol for example ethane-1,2-diol, propane-1,3-diol, butane-1,-4-diol, hexane-1,6-diol, octane-1,8-diol and decane-1,10-diol.

The polyol can also be a polyether polyol of formula (5):

$$H\text{---}[O(CH_2)_n]_m\text{---}OH \quad (5)$$

where n is from 2 to 6 and m is from 2 to 100; especially polyoxytetramethylene glycols having molecular weights in the range 500 to 3000.

A further class of polyols consists of polyether polyols having the general formula (6):

$$H(OCH_2CH_2)_p\text{---}O\text{-}\bigcirc\underset{\underset{CH_3}{|}}{\overset{\overset{CH_3}{|}}{C}}\bigcirc\text{-}O\text{---}(CH_2CH_2O)_q\text{---}H \quad (6)$$

where p and q are nominally from 2 to 5.

Such compounds are commercially available under the Trade Mark Dianol. For example, Dianol 22 where p and q are both 2, Dianol 2211 which is a mixture of isomers such that p+q is 4, Dianol 2213 where p+q is 6.5 and Dianol 2214 where p+q is 8.5.

The polyol can also be polycaprolactone diol of formula (7):

$$HO\text{---}\left[(CH_5)\text{---}\overset{\overset{O}{\|}}{C}\text{---}O\right]_{s1}\text{---}(CH_2)_r\text{---}\left[O\text{---}\overset{\overset{O}{\|}}{C}\text{---}(CH_2)_5\right]_{s2}\text{---}OH \quad (7)$$

where r is from 2 to 6 and s is a number such that the molecular weight of the diol is from 530 to 2000.

Preferably the polyol is a polycaprolactone diol of molecular weight 500, such a diol is sold as PCP0200.

Preferably any free epoxide groups present in the assembled molecule prepared from the epoxide (4), the polyol, and the steric stabilising agent are esterified with benzoic acid.

Chain extended epoxides of formula (3) are known and can be prepared by standard processes.

One class of aqueous dispersion of film-forming polymer of this type to which a metal salt can be added so as to produce a composition in accordance with this invention is disclosed in European Patent EP-B-0109760.

The dispersed coating materials disclosed in EP-B-0109760 have low electrophoretic mobility. The electrophoretic mobility of particles of the material is measured by standard methods at very high dilution in $10^{-3}$M potassium chloride and at the pH to be employed in a coating process and at which the dispersion is stable. Preferably the electrophoretic mobility is not greater than 2 $\mu$m/s/V/cm, more preferably not greater than 1.5 and still more preferably not greater than 1 $\mu$/s/V/cm.

The compositions disclosed in EP-B-0109760 have a very low conductivity. Preferably the conductivity of the aqueous medium is less than 250 microSiemens/cm when the disperse polymer phase constitutes 10% by weight of the total weight of the dispersion, more preferably less than 150 microSiemens/cm.

The dispersions described in EP-B-0109760 comprise at least one film-forming polymer which is sterically stabilised in the aqueous medium and which is free from stabilising ionic charges. Mixtures of polymers, for example mixtures with other types of polymer, may be employed provided that the stability of the dispersion as a whole conforms to the requirements of the process.

Advanced epoxy resins may be made according to or by analogy with known processes. Examples of such known processes are given in United States Patent 4035275.

Another suitable class of dispersion for use in this invention is disclosed in our co-pending British Patent Application 8729797. This class of dispersion comprises a co-polymer that is itself capable of forming sterically stabilised dispersions in aqueous media and comprising steric stabilising units, structural units, and amine group containing units, the amine group containing units comprising tertiary amine groups or an acid addition salt thereof or quaternary ammonium groups; the amounts of amine group-containing units being such that the co-polymer contains from 0.025 to 0.5 milli equivalents of amine per gram of co-polymer.

The co-polymer component can be a condensation polymer, an epoxy resin or an addition polymer.

The condensation polymers disclosed in British Patent Application 8729797 and within the scope of this invention consist of structural units derived from di-, tri- and tetra-carboxylic acids and being of general formula (8):

where A is the residue of an aromatic, alicyclic or aliphatic carboxylic acid and a is 2, 3 or 4; units derived from di- or triols of general formula (9):

 (9)

where D is the residue of an aromatic, alicyclic or aliphatic di- or triol and b is 2 or 3; and amine groups containing units of formula (10):

$$R^1R^2R^3N^+(CH_2)_cE \qquad (10)$$

where $R^1$ and $R^2$ are the same or different $C_{1-6}$ alkyl, or $R^1$ and $R^2$ together represent the residue of a piperidine or morpholine group $R^3$ is hydrogen, $C_{1-6}$ alkyl or benzyl, and E is —O—, —N<, —NH—, —OCO— or —CO$_2$—
and c is from 2 to 6.

By way of example, one class of carboxylic acids from which the structural units of formula (8) can be derived are $C_{2-6}$ alkane dicarboxylic acids for example ethane-1,2-dicarboxylic acid, butane-1,4-dicarboxylic acid and hexane-1,6-dicarboxylic acid.

A further class of carboxylic acids from which the structural units of formula (8) can be derived are six membered alicyclic and aromatic carboxylic acids containing 2,3 or 4 carboxyl groups and in particular cyclohexane-1,2-dicarboxylic acid, cyclohex-1-ene-1,2-dicarboxylic acid, phthalic acid, iso-phthalic acid, trimellitic acid and benzene-1,2,4,5-tetracarboxylic acid.

These structural units of formula (8) can also be derived from Diels-Alder adducts between optionally substituted cyclopentadiene and maleic anhydride. In particular, the unit can be derived from the Diels-Alder adduct of cyclopentadiene and maleic anhydride (Nadic anhydride) or the Diels-Alder adduct of 1,2,3,4,5-pentachlorocyclopentadiene and maleic anhydride (chlorendic anhydride).

Preferably the structural unit of formula (8) is derived from phthalic acid, iso-phthalic acid or trimelitic acids.

The unit of general formula (9) can be the residue of an aromatic alicylic or aliphatic diol or triol.

The aliphatic diol or triol can be a straight or branched chain $C_{2-10}$ alkane diol or triol. Examples of such compounds are ethane-1,2-diol, propane-1,3-diol, propane-1,2-diol, butane-1,4-diol, pentane-1,5-diol, hexane-1,6-diol, decane-1,10-diol, propane-1,2,-3-triol and trimethylolpropane.

An example of an aromatic diol is bisphenol-A.

One class of amine group containing units of formula (10) is where E is —O, and this class has general formula (11):

$$R^1R^2R^3N^+(CH_2)_c—O— \qquad (11)$$

where $R^1$ to $R^3$ and c are as defined with reference to formula (8).

A further class of amine group containing unit of formula (10) is where E is —N< and this class has the general formula (12):

$$R^1R^2R^3N^+(CH_2)_c—N< \qquad (12)$$

where $R^1$ to $R^3$ and c are as defined with reference to formula (10).

A further class of amine group containing units of formula (10) is where E is —NH— and this class has the general formula (13):

$$R^1R^2R^3N^+(CH_2)_c—NH— \qquad (13)$$

where $R^1$ to $R^3$ and c are defined with reference to formula (10).

Examples of $C_{1-6}$ alkyl groups for $R^1$ to $R^3$ are methyl, ethyl and n-propyl.

Examples of values for c are 2,3,4 and 6.

Examples of $R^1R^2R^3N^+(CH_2)_c$ groups are: NNN-trimethylaminoethyl, NNN-trimethylaminopropyl, NNN-trimethylaminobutyl and NNN-trimethylaminohexyl.

Continuing to refer to the class of dispersion disclosed in British Patent Application 8729797, epoxy resins of this class of film-forming polymer comprise structural units of general formula (14):

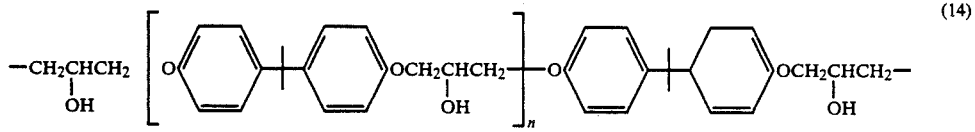

where n is from 0 to 4. For example n can be 0.1, 2 or 3.7.

Preferably the molecular weight is from 360 to 7,000.

The amine group-containing units for this class of co-polymer have general formula (15):

where $R^1$ to $R^3$ are as defined with reference to formula (10).

Referring to $R^1$ to $R^3$, examples of substituents and preferred substituents are as described with reference to formula (10).

A further class of film-formers disclosed in British Patent Application 8729797 and within the scope of this invention are addition co-polymers comprising a plurality of structural units which are the same or different and are of formula (16):

where
$R^4$ is hydrogen or $C_{1-6}$ alkyl and
$R^5$ is a group $-CO_2R^6$ where $R^6$ is $C_{1-10}$ alkyl or provided $R^4$ is hydrogen, $R^5$ is phenyl optionally substituted with one or more $C_{1-4}$ alkyl groups;
and amine groups containing units of formula (17):

where
$R^7$ is hydrogen or $C_{1-6}$ alkyl and
$R^8$ is a group $-A(CH_2)_nNR^9R^{10}R^{11}$; where n is from 2 to 6, A is a group $-CO_2-$, $-CONH$; or provided $R^7$ is hydrogen, $R^8$ is pyridino, N—$C_{1-6}$alkyl pyridino or N-benzyl pyridino;
$R^9$ is $C_{1-6}$ alkyl;
$R^{10}$ is $C_{1-6}$ alkyl or
$R^9$ and $R^{10}$ taken together form a piperidino or morpholino group;
$R^{11}$ is hydrogen, $C_{1-6}$ alkyl or benzyl.

Referring to the unit of formula (16), examples of $C_{1-6}$ alkyl groups for $R^4$ are methyl, ethyl and n-propyl. Preferably $R^4$ is hydrogen or methyl.

Examples of $C_{1-10}$ alkyl groups for $R^6$ are methyl, ethyl, n-propyl, n-butyl, n-pentyl, n-hexyl, n-octyl, 2-ethylhexyl and n-decyl. When $R^4$ is methyl and $R^5$ is a group $-CO_2R^6$, preferably $R^6$ is also methyl. When $R^4$ is hydrogen and $R^5$ is a group $-CO_2R^6$, preferably $R^6$ is 2-ethylhexyl.

When $R^5$ is optionally substituted phenyl, examples of optional $C_{1-4}$ alkyl substituents for $R^5$ are methyl, ethyl, n-propyl, n-butyl and t-butyl. When $R^5$ is optionally substituted phenyl, preferably it is phenyl or 4-t-butylphenyl and preferably $R^4$ is hydrogen.

One particular class of addition co-polymer comprises structural units of formula (16) where $R^4$ is methyl and $R^5$ is $-CO_2R^6$ where $R^6$ is methyl together with structural units of formula (16) where $R^1$ is hydrogen and $R^5$ is $-CO_2R^6$ where $R^3$ is 2-ethylhexyl.

A further class of co-polymer comprises in addition to the structural units of formula (16), auxiliary structural units of formula (18):

where $R^{12}$ is hydrogen, $C_{1-6}$ alkyl particularly methyl and $R^{13}$ is $-CO_2R^{14}$ where $R^{14}$ is 1,2-epoxypropyl or 1-(4-nitrobenzoyloxy)-2-hydroxylpropyl.

Referring to the amine group-containing unit of formula (17), examples of values for n are 2 and 3.

Preferably A is $-CO_2-$ in which case n is 2. Examples of $C_{1-6}$ alkyl groups for $R^9$, $R^{10}$ and $R^{11}$ are methyl, ethyl and n-propyl.

Preferably $R^9$ and $R^{10}$ are both methyl and is benzyl.

The condensation polymers of this invention can be prepared by analogy with known methods for example by reacting an acid of general formula (19):

where A and a is as defined with reference to formula (8) or an activated esterifying derivative thereof (for example an anhydride) with a di- or triol of general formula (20):

where D and b are as defined with reference to formula (9) or an esterifying derivative thereof, and an amine of formula (21):

where $R^1$, $R^2$ and c are as previously defined and $R^{15}$ is hydrogen or $C_{1-6}$ alkyl; and with a polyethylene glycol, a polyethyleneglycol mono-$C_{1-4}$ alkyl ether, a poly-(ethylene oxide)-poly(propylene oxide) co-polymer containing at least 40% of polyethylene oxide and thereafter optionally quaternised the product so obtained with a quaternising agent $R^3X$ where $R^3$ is $C_{1-6}$ alkyl or benzyl and salifying the product so obtained with an addition salt-forming acid.

The reaction between the acid, alcohol and amine can be carried out in an inert solvent for example toluene at moderately elevated temperatures for example 100°–280° C. depending on the reflux point of the solvent. The quaternisation reaction can be carried out in moderate temperatures for example from room temperature to 130° C. optionally in the presence of a solvent.

The salification step can be carried out in the presence of a solvent at moderate or slightly elevated temperatures, for example ambient temperature.

Co-polymers according to this invention that are based on epoxy resins can also be prepared by analogy with standard methods. For example an epoxy resin of formula (22):

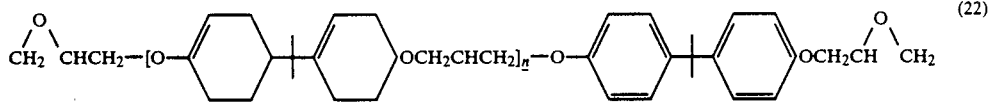

where n is as previously defined with reference to formula (14) with a compound of formula (23):

$$R^1R^2NH \qquad (23)$$

where $R^1$ and $R^2$ are as defined with reference to formula (15) and thereafter optionally quaternising the product so obtained with a quaternising agent $R^3X$ where $R^3$ is $C_{1-6}$ alkyl or benzyl and salifying the product so obtained with an addition salt forming acid.

The reaction between the epoxide of formula (22) and the compound of formula (23) can be carried out by standard methods for example at moderate temperatures (70°–150° C.) in the presence of a solvent.

The quaternising reaction can be carried out as previously described.

Where the co-polymer is an addition co-polymer, it can also be made by analogy with standard methods, for example by addition polymerisation in the presence of an initiator of monomers of formula (24):

$$CH_2=CR^4R^5 \qquad (24)$$

where $R^4$ and $R^5$ are as defined with reference to formula (16); and
amine group containing monomers of formula (25):

$$CH_2=CR^7R^8 \qquad (25)$$

where $R^7$ and $R^8$ are as defined with reference to formula (17);
and stabiliser group-containing monomers of formula (1):

$$CH_2=CH.CO.O(C_4H_8O)_y(C_2H_4O)_xOCH_3 \qquad (1)$$

or formula (2):

$$CH_3O(C_2H_4O)_x(C_4H_8O)_y CO.\underset{\underset{CH_3}{|}}{C}=CH_2 \qquad (2)$$

where x and y are as previously defined and the product so obtained optionally quaternised and salified.

The addition polymerisation of monomers of formula (24), (25), (1) and (2) can be carried out in solution or in dispersion. For a solution polymerisation process, the monomers are fed into a solvent continuously at a rate which approximates to the rate of polymer formation.

Examples of solvents that can be used in the process of this invention are hydrocarbons, especially toluene, $C_{1-4}$ alkyl- $C_{2-6}$ alkanoate esters, especially ethyl acetate and $C_{1-4}$ ketones for example acetone, methyl ethylketone and methyl isobutylketone.

The reaction can be carried out at moderate temperatures. The particular temperature depends upon the nature of the initiator for the addition reaction.

The solvent is chosen such that its reflux temperature is close to the optimum temperature of operation for the initiator.

This process results in a solution of co-polymer.

Dispersion polymerisation can be carried out in a liquid medium, usually an aqueous medium that is a solvent for the monomers but a non-solvent for the co-polymer.

Examples of such liquid media are ethanol/water and acetone/water.

This process results in an aqueous emulsion that is essentially a complex mixture of co-polymers some containing both steric stabilising units and amine group containing units whereas others contain steric stabilising units but no amine group- containing units or contain amine group containing units but no steric stabilising units.

The quaternisation step can be carried out as previously described.

The film-forming polymers described here are used as aqueous dispersions in the process and compositions of this invention. Such dispersions are formed either directly during the polymerisation process or by dispersing the preformed polymer.

The coating compositions of this invention can also comprise other standard ingredients for example pigments, fillers, anti-corrosive agents, crosslinking agents and other polymer-modifying materials.

The compositions can be prepared by adding the metal salt or a mixture of metal salts to a pre-formed aqueous dispersion of film-forming polymer.

The process of this invention is carried out at moderate temperatures for example from 5° to 50° C. especially from 10° to 35° C.

The potential difference applied between the target object that is the object to be coated and the counter electrode, is set such that the current density is from 1 to 35 millamps cm$^{-2}$.

Preferably a potential difference is applied such that the maximum current density is 30 milliamps cm$^{-2}$ or more preferably 25 milliamps cm$^{-2}$ and the minimum current density is 1 milliamp cm$^{-2}$ or more preferably 3 milliamps cm$^{-2}$.

The coatings produced by the process of the invention may be subsequently subjected to a stoving step.

According to the present invention there is also provided a coating process which comprises the steps of:
(i) coating an article simultaneously with a metal and a film-forming polymer by passing an electric current at a current density of 1 to 35 milliamps cm$^{-2}$ between the article as a cathode and a counter-electrode immersed in an aqueous coating composition having an inherent pH of 2.5 to 9.5, comprising;
   (a) a dispersion in an aqueous carrier of a film-forming polymer having steric stabilising units and being free from ionic stabilising units, the dispersion being one which has a critical coalescence value more negative than −0.3 units, and
(b) at least 0.06% by weight based on the total composition of one or more zinc, cadmium, cobalt, iron, lead or nickel salts such that the dispersion has a critical coalescence temperature of 35° to 95° C., and thereafter,
(ii) stoving the coated article.

Such stoved coatings are found to give superior corrosion resistance.

The temperature and duration of the stoving step will vary according to the type of polymer involved and with the nature of any crosslinker which may be included. Typically the temperature at which the stoving step is carried out is between 80° and 300° C. Preferably the stoving step is carried out between 100° and 250° C. and most preferably between 120° and 200° C.

The duration of the stoving step will vary both with the nature of the polymer and any crosslinker and also with the stoving temperature. Typically the duration of the stoving step is between 5 and 60 minutes. Preferably the duration is between 10 and 40 minutes.

The coatings formed by an electrodeposition process according to the invention may be topcoated with a conventional topcoat.

According to the present invention there is also provided a coating process which comprises the steps of:
(i) coating an article simultaneously with a metal and a film-forming polymer by passing an electric current at a current density of 1 to 35 milliamps cm$^{-2}$ between the article as a cathode and a counter-electrode immersed in an aqueous coating composition having an inherent pH of 2.5 to 9.5, comprising;
(a) a dispersion in an aqueous carrier of a film-forming polymer having steric stabilising units and being free from ionic stabilising units, the dispersion being one which has a critical coalescence value more negative than −0.3 units, and
(b) at least 0.06% by weight based on the total composition of one or more zinc, cadmium, cobalt, iron, lead or nickel salts such that the dispersion has a critical coalescence temperature of 35° to 95° C.
(ii) stoving the coated article, and thereafter
(iii) applying a topcoat.

The choice of topcoat depends on the final use to which the coated article is to be put. In general any topcoat may be used which does not adversely affect the coating applied in step (i) of the process.

The topcoat may be applied by conventional means such as dipping, rollercoating, brushing or spraying.

The following Examples illustrate the invention.

EXAMPLES

EXAMPLE 1

(i) Preparation of soluble zinc salt solution

A slurry of zinc oxide (65 parts) in deionised water (350 parts) was produced by stirring in a suitable glass container Glacial acetic acid (96 parts) was added to the slurry with stirring followed by ethylene diamine tetraacetic acid (117 parts), to form a clear solution. "880" ammonia solution (115 parts) and deionised water (57 parts) were added with stirring. The product was a clear solution with a pH of 7 which contained 6.5% of zinc by weight.

(ii) Preparation of film forming polymer

A 10 liter flask was charged with Epikote 1001 (a bisphenol-A/epichlorhydrin condensate resin of epoxide equivalent of 62 mg KOH/g Epikote 1001 is a registered trademark of Shell Chemicals). (4098 parts), polycaprolactone diol PCP0200 (from Union Carbide) (1035 parts), methyl isobutyl ketone (700 parts), dimethyl benzylamine (11 parts). The mixture was heated for 7 hours with stirring at 120° C. The mono-methyl ether of a poly(ethylene glycol) of molecular weight of approximately 2000, (648 parts) benzoic acid, (338 parts), and methyl isobutyl ketone (1200 parts) were then added and heating was continued at 120° C. for a further 7 hours to produce a clear product of viscosity 28 poise at 50° C. as measured by using a cone and plate viscometer (with heated bottom plate).

(iii) Preparation of film forming material

A mixture of the resin prepared in (ii) above (870 parts), and a highly butylated melamine-formaldehyde resin (of 67% non-volatile content carried in a solvent blend of butanol and xylene in the ratio of 92:8 with a body-tube viscosity between 7 and 11 seconds at 25° C. The melamine formaldehyde resin was prepared from the reaction of a mixture of melamine, aqueous formaldehyde, butanol and methanol in the ratio of 1:7.43:7.61:1.43; 492 parts), benzoic acid (2 parts), were held at 100° C. with stirring for 2 hours.

(iv) Emulsification

The resin blend from (iii) above was emulsified in deionised water using a high speed stirrer to produce a fine stable emulsion of 25% solid content. The emulsion had a critical coalescence value of −0.6.

(v) Preparation of dual metal plating and organic film-forming composition

A mixture of a resin emulsion formed in (iv) above (52 parts), the zinc solution from part (i) above (5.2 parts), and a solution of 5% butyl cellosolve and 2-butoxy ethanol in deionised water was made. The resultant composition suitable for the electro-deposition of zinc and organic film former from a single composition comprised 0.34% by weight of zinc and 13% by weight of non volatile organic film former. The critical coalescence temperature of the composition was 63° C., the critical coaelsence value was −0.6, and the pH of the composition was 7.

(vi) Deposition

The composition from (v) above was warmed to 30° C. Two metal panels were inserted into the composition. One of these, a clean bare steel panel of approximate dimensions 10 cm×15 cm was electrically connected to a variable DC power supply unit so as to form a cathode and the other panel was connected to the same power unit so as to form an anode. A current of about 6 mA/cm$^2$ was made to flow between the two electrodes for 26 minutes. The steel cathode was then removed, rinsed with water, allowed to dry in air, at room temperature, and then stoved for 20 minutes at 150° C. On cooling it was found that 60 grams per square meter of material has been deposited which comprised 12% by weight of zinc as analysed by atomic absorption spectroscopy.

EXAMPLE 2

(i) Preparation of dual metal-plating and organic film-forming composition

A resin emulsion according to example 1 (iv) (52 parts), a zinc ion solution according to example 1 (i) (4.9 parts), and a solution of 5% by weight of butyl cellosolve in deionised water (43.1 parts) were mixed to form a electrodepositable composition. This composition contained 0.9% by weight of zinc, had a critical coalescence temperature of 57° C. and a pH of 7.

(ii) Electrodeposition

A deposition using similar conditions to those in example 1 (vi) was carried out with a current density of 6 mA/cm² for 26 minutes, the bath being maintained at 30° C. It was found that 53 g/m² of material was deposited on the steel cathode after rinsing and stoving, and that this deposit contained 28% by weight of zinc.

EXAMPLE 3

(i) Preparation of dual metal plating and organic film-forming composition

A resin emulsion according to Example 1 (iv) (52 parts), a zinc ion solution according to Example 1 (i) (13.8 parts) and a solution of 5% by weight of butyl cellosolve in deionised water (34.2 parts) were mixed to form an electrodedepositable composition. This composition contains 0.9% by weight of zinc, had a critical coalescence temperature of 57° C. and a pH of 7.

ii. Electrodeposition

A deposition using similar conditions to those in example 1 (vi) was carried out with a current of 5.4 mA/cm² for 24 minutes, the bath being maintained at 30° C. It was found that 44 g/m² of composition was deposited on the steel cathode after rinsing and stoving, and that this deposit contained 28% by weight of zinc.

EXAMPLE 4

A composition according to Example 1 (v) was placed into a suitable container and cooled to 2° C. Two metal panels were placed in this solution identical in type and arrangement to those described in Example 1 (vi). A current averaging 5.4 mA./cm² was passed between the plates for 20 minutes. The cathode was removed, rinsed with water, allowed to dry in air at room temperature and then was stoved for 30 mins at 150° C. After cooling it was found that 23 g/m² of material had been deposited on the cathode and that this deposit comprised 36% by weight of zinc as analysed by atomic absorption spectroscopy.

EXAMPLE 5

(i) Cadmium salt solution

A cadmium salt solution was prepared by mixing cadmium acetate dihydrate (139 parts), ethylene diamine tetra-acetic acid (150 parts), deionised water (400 parts), and "880" aqueous ammonia solution (210 parts). The resultant solution had a pH of 6.2, and contained 6.5% by weight of cadmium.

(ii) Preparation of dual metal plating and organic film forming composition

A mixture of the emulsion from Example 1 (iv) (48.8 parts), the cadmium salt solution from part (i) above (9.2 parts) and a solution of 5% by weight of butyl cellosolve in deionised water (42 parts) was formed. The resultant stable composition contained 0.5% by weight of cadmium, had a critical coalescence temperature of 55° C., and a pH of 6.2.

(iii) Electrodeposition

The cadmium-containing emulsion from part (ii) above was placed in a suitable container and warmed to 30° C. Two metal plates each of approximate dimensions 10 cm × 15 cm were immersed in the composition, the plates being connected to a variable DC power supply unit. The plate which formed the anode was made of cadmium and the cathode of steel. Electric current was caused to flow between the electrodes giving an average current density of 5.4 mA/cm² for 17 minutes. The steel cathode was then removed, rinsed with water, allowed to dry in air room temperature, and then stoved for 30 minutes at 150° C. It was found that 30 g/m² of material had been deposited on the steel cathode and that 60% by weight of the deposit was cadmium.

EXAMPLE 6

(i) Preparation of the film-forming material

Resin prepared in example 1 (ii) (870 parts) were blended with Uravar-L9 (550 parts) (Uravar-L9 is from Synthetic Resins Ltd).

(ii) Emulsification

The resin blend was then emulsified in deionised water using a high speed stirrer to produce a fine stable emulsion which had a non-volatile solids content of 24.25%. The critical coalescence value of the emulsion was −0.58.

(iii) Preparation of soluble cobalt salt solution

Cobalt acetate tetrahydrate (10.14 parts), a 5% by weight solution of "butyl cellosolve" in deionised water (100 parts), and acetic acid (0.3 parts) were mixed to form a solution which had a pH of 5.5.

iv. Preparation of dual metal plating and organic film-forming composition

Deionised water (168.56 parts) and the cobalt solution from (iii) above (110.44 parts) were added to the emulsion from part (ii) above (321 parts) to give an electrodepositable composition. The composition had 13% by weight of non volatile solids, and contained 0.4% by weight of cobalt. Its critical coalescence temperature was 60° C., and its pH was 5.5.

(v) Electrodeposition

The composition from part (iv) above was placed into a suitable container and warmed to 32° C. Two metal plates approximately 10 cm × 15 cm were immersed in the composition and were connected to a variable DC power supply unit, the cathode plate being mild steel and the anode plate being stainless steel. A current was passed between the plates at a current density of 6 mA./cm² for 26 minutes. The steel cathode was removed from the bath, rinsed with water, allowed to dry in air, and then stoved for 30 minutes at 180° C. On cooling it was found that 34 g/m² of material had been deposited, which comprised 50% by weight of cobalt.

EXAMPLE 7

(i) Preparation of mixed zinc and cobalt solution

A zinc salt solution according to example 1 (i) (31 parts), and cobalt acetate tetrahydrate (3.65 parts) were added to deionised water (63.35 parts) to form a clear pink aqueous solution of pH 6.5, which contained 2.9% of metal by weight.

(ii) Preparation of film-forming material

The film-forming polymer resin according example 1(ii) (1.58 parts) was blended with "Uravar-L" L9 (1 part) (Uravar L9 is from Synthetic Resins Ltd.).

(iii) Emulsification

The resin blend from part (ii) above was emulsified in a solution of 5% butyl cellosolve in deionised water using a high speed stirrer to produce a fine stable emulsion which contained 15.54% of non-volatile solid material, and which had a critical coalescence value of −0.58.

(iv) Preparation of dual metal plating and organic film forming composition 98 parts of the mixed salt solution from part (i) above were added to 502 parts of the emulsion from part (iii) above to give a composition containing 13% by weight of non-volatile material of pH 6.5, and with a critical coalescence temperature of 58° C. The composition comprised 0.48% of total metal content in the ratio of 3:7 by weight of cobalt to zinc.

(v) Electrodeposition

The composition from part (iv) above was placed into a suitable container and heated to 30° C. Two metal panels of approximate dimensions 10 cm × 15 cm were immersed in this composition and were connected to a variable DC power supply unit so as to form a pair of electrodes in the bath. A current was passed at constant voltage between the two plates at 6 mA./m$^2$ for 26 minutes. The mild steel cathode was removed from the bath, rinsed with water, allowed to dry at room temperature in air and stoved for 30 minutes at 150° C. On cooling it was found that 39 g/m$^2$ of material had been deposited which comprised 26% by weight of metal, the metals being in the ratio of 1 to 6:4 of cobalt to zinc.

EXAMPLE 8

(i) Preparation of soluble nickel salt solution

Nickel acetate-tetrahydrate (10.18 grams) and acetic acid (0.9 grams) were dissolved in a solution of 5% by weight "butylcellosolve" in deionised water (150 parts) to give a slightly blue clear solution. The solution had a pH of 5.5 and comprised 1.5% by weight of nickel.

(ii) Preparation of dual metal plating and organic film forming composition

The solution from part (i) above (162 parts) was added to a film forming composition according to example 6(ii). Deionised water (117 parts) was added to give a composition of pH 5.5 comprising 13% by weight of non-volatile material and comprising 0.4% by weight of nickel. The composition had a critical coalescence temperature of 60° C.

(iii) Electrodeposition

The composition according to part (ii) above was placed into a suitable container and warmed to 30° C. Two steel plates of approximate dimensions 10 cm × 15 cm were immersed in the composition and were connected to a variable DC power supply unit. An electric current was passed between the plates at an approximate current density of 6 mA./cm$^2$ for 26 minutes. The plate forming the cathode was removed from the bath, rinsed with water, allowed to dry in air, and then stoved at 150° C. for 30 minutes. On cooling it was found that 25 g/m$^2$ of material had been deposited which comprised 72% by weight of nickel.

EXAMPLE 9

(i) Preparation of film forming composition

A blocked isocyanate of the type described by D. Solomon on page 226 in "The Chemistry of Organic Film Formers", second addition (I.E. Kreiger Publishing Company), (and prepared form 2-ethylhexanol/-trimethylolpropane/toluene diisocyanate in the molar of ratio of 1/0.34/1, having a viscosity of 87 seconds in a 'body tube' and 65% solids in a 76/24 mixture of methylisobutyl-ketone/monoethylether of ethylene glycol) (222 parts) was added to the film forming polymer according to example 1 (ii) (426 parts).

(ii) Emulsification

The resin blend from (i) above was emulsified in a solution of 5% "butyl cellosolve" in deionised water using a high speed stirrer to produce a fine stable emulsion of 23.2% by weight of nonvolatile solids content. The critical colescence value of the emulsion was −0.6.

(iii) Preparation of lead salt solution

Lead monoxide (25 parts) and acetic acid (13.5 parts) were dissolved in deionised water (120 parts) by gentle heating and stirring. Ethylene diamine (13.5 parts) were added, and the pH of the solution was adjusted to pH 7 by the addition of small quantities of acetic acid. The resulting aqueous solution contained 12.28% by weight of lead.

(iv) Preparation of dual metal plating and organic film forming composition

The film forming composition from part (ii) above (175 parts) and the lead salt solution from part (iii) (57 parts) were dissolved in deionised water (295 parts). This produced a composition of approximately 13% by weight of non-volatile content, a pH of 6.8 and which contained 0.9% by weight as lead. The critical coalescene temperature of the composition was 59° C.

(v) Electrodeposition

The composition from (iv) above was placed into a suitable container and heated to 30° C. Two metal plates of approximate dimensions 10 cm × 15 cm were immersed in the composition and were connected to the terminals of a variable DC power supply unit. A current was made to pass between the two electrodes immersed in the composition at an average current density of 2 mA./cm$^2$ for 11 minutes. The plate forming the cathode was then removed from the composition, rinsed with water, air dried, and then stoved for 30 minutes at 150° C. On cooling it was found that 18 grams per square meter of material had been deposited on this plate and that the deposit contained 54% by weight of lead.

EXAMPLE 10

Electrodeposition

A composition according to Example 1 (v) was placed in a suitable container and heated to 28° C. Two metal plates of approximate dimensions 10 cm × 15 cm were immersed in the composition and were connected to the terminals of a variable DC power supply unit. An electric current was passed between one plate as anode which was zinc and a mild steel cathode, the current having an average current density of 25 mA./cm$^2$ for 10 minutes. The steel cathode was removed from the composition, rinsed with water, air dried, and then stoved for 30 minutes at 150° C. On cooling it was found that 174 g/m$^2$ of material had been deposited which comprised 7% by weight of zinc.

EXAMPLE 11

(i) Preparation of a zinc salt solution

Zinc cyanide (17.7 parts), sodium cyanide (16.3 parts) and "880" ammonia solution (19 parts) were dissolved in deionised water (150 parts) by warming to 40° C. until a clear solution was obtained. The pH was adjusted to 9.5, and sufficient deionised water was added to result in 358 grams of solution in total. The solution comprised 2.75% by weight of zinc.

(ii) Preparation of coating composition

A resin emulsion as described in Example 1 (iv) (389.2 parts) and a zinc solution as in part (i) above (103 parts) were added to a solution of 5% by weight of "butyl cellosolve" in deionised water (257.8 parts) to form an electrodepositable film-forming composition with a pH of 9.5, and a zinc content of 0.38% by weight. The critical coalescence temperature of the composition was 40° C.

(iii) Electrodeposition

The composition from part (ii) above was placed into a suitable container containing a zinc anode and a mild steel panel of approximate dimensions 15 cm × 10 cm as cathode, and warmed to 30° C. A current was passed between the cathode and anode with an average current density of 5.8 mA/cm$^2$ for 25 minutes. The cathode was removed from the composition, rinsed with water, dried in air and then stoved for 20 minutes at 150° C. It was found that 46 g/m$^2$ of material had been deposited which comprised 9.6% by weight of zinc.

EXAMPLE 12

(i) Preparation of Metal Salt Solution

A solution comprising cobalt acetate tetrahydrate (3.65 parts) was added to zinc complex salt solution made as described in Example 1 (i) (31 parts) and a 5% butyl cellosolve in deionised water (22.5 parts). The resulting solution had a pH of 6.5 and comprised 5.0% by weight of metal.

(ii) Preparation of Film-Forming Material

A resin emulsion according to Example 6 (ii) (332 parts) was diluted with 5% butyl cellosolve in deionised water (170 parts) to give a total of 502 parts by weight. The emulsion had a non volatile content of 16.1%.

(iii) Preparation of dual metal plating and organic film-forming composition

The metal salt solution as described in Example 12 (i) was added to emulsion prepared as described in Example 12 (ii) above and the total was made up to 600 parts by the addition of deionised water. The resulting composition had a pH of 6.5 and comprised 0.48% by weight of metal. The critical coalescence temperature of the composition was 57° C.

(iv) Electrodeposition

A linished bare steel panel, serving as a cathode in an electrodeposition cell was immersed in the mixture as described above and current at the rate of 6 mA/cm$^2$ was made to flow for 26 minutes, while the bath temperature was maintained at 30° C.

On completion of the electrodeposition the panel was rinsed and stoved in an oven at 150° C. for 30 minutes, to give 24 g/m$^2$ of total deposit, of which 75% by weight was resin.

(v) Comparative Test

Film-forming polymer was electrodeposited from the emulsion described in Example 12 (ii) on to a linished bare steel panel according to the method of Example 12(iv) to give a deposited film weight of 66 g/m$^2$ after stoving at 175° C. for 30 minutes.

This panel and the panel obtained as described in Example 12 (iv) were coated with a white alkyd-M/F topcoat, commercially available from ICI as M625-MC78, by spray application to give a topcoat film equivalent to 46g/m$^2$ after stoving at 130° C. for 30 minutes.

The two panels were scribed and tested for salt spray corrosion resistance in accordance with the method specified by the ASTM B117.

It was found that the panel prepared as described in Example 12 (iv) had approximately 1 mm undercut from the scribe mark after 14 days testing while the control panel was undercut by approximately 9 mm from the scribe mark, thus demonstrating the superior corrosion resistance properties of the metal-and-polymer dual deposit.

EXAMPLE 13

(i) Preparation of the zinc salt solution

A portion (40.68 parts) of the zinc salt solution prepared as described in Example 1(i) was mixed with deionised water (59.3 parts), to give a solution with a pH of 7, and which comprised 6.5% by weight of zinc.

(ii) Preparation of film-forming polymer

| Component | Parts | % |
|---|---|---|
| Toluene | 420 | 33.723 |
| Reaction Mixture | | |
| Methylmethacrylate | 347.1 | 27.868 |
| 2 Ethylhexylacrylate | 323.0 | 25.433 |
| Glycidylmethacrylate | 39.0 | 3.131 |
| Dimethylaminoethylmethacrylate | 5.5 | 0.442 |
| Methoxy PEG 2000 methacrylate (60% solution in toluene) | 97.5 | 7.828 |
| Azodiisobutyronitrile | 7.8 | 0.626 |

The reaction mixture described above was added over 45 min to pre heated (80 C) toluene (420 parts) and the mixture was maintained at that temperature for 75 min. Azodiisobutyronitrile (0.4 parts) was added and heating was continued for 60 min when a second portion (0.4 parts) of azodiisobutyronitrile was added. Heating was continued for a further 60 min after which time benzyl chloride (4.8 parts) was added and the mixture was again heated for a further 90 min.

(iii) Preparation of emulsion

The polymer solution prepared as described in Example 12(i) above (24.4 parts) was mixed with acetone (4.9 parts) and emulsified in de-ionised water (70.7 parts). The resulting emulsion had a critical coalescence value of −0.6 and a non-volatile content of 15.2% by weight.

(iv) Preparation of Coating Composition

The zinc salt solution of Example 13 (i) The emulsion prepared as described in Example 13 (iii) was added with stirring to in the ratio of 2 parts of emulsion to 1 part of salt solution. The resulting composition had a pH of 7 and comprised 0.88% by weight of zinc. The critical coalescence temperature of the compositions was 63° C.

(v) Electrodeposition

The zinc salt-polymer emulsion mixture was placed at 28° C. in an electrodeposition cell fitted with a linished bare steel panel acting as a cathode. On applying a potential, current of density of approximately 6 mA/cm$^2$ was made to flow for ten minutes.

On removing the panel from the electrodeposition apparatus a black metallic deposit was seen to have been co-deposited with the polymer on the cathode.

EXAMPLE 14

(i) Preparation of the film-forming material

Resin prepared in Example 1 (ii) (1054.5 parts) was blended with Uravar-L9 (329.4 parts) (Uravar-L9 is from Synthetic Resins Limited).

(ii) Emulsification

The resin blend was then emulsified in deionised water containing 5% butyl cellosolve to produce a fine stable emulsion which had a non-volatile solids content of 27.5% by weight. The resulting emulsion has a critical coalescence value of −0.57.

(iii) Preparation of mixed soluble cobalt and zinc salt solution

Cobalt acetatetetrahydrate (0.957 parts) was dissolved in the zinc salt solution (31.373 parts) described in Example 1(i) and deionised water (52.339 parts) to give a clear pink solution. The solution had a pH of 7 and comprised 2.68% by weight of metal.

(iv) Preparation of dual metal plating and organic film-forming composition

The mixed salt solution (iii) (85 parts) were diluted with a 5% butyl cellosolve solution in deionised water (231 parts) and the solution was added with stirring to the emulsion (ii) described above (284 parts). The pH of the resulting composition was 7 and it comprised 0.38% by weight of metal. The critical coalescence temperature of the composition was 57° C.

(v) Electrodeposition

The mixture (iv) was placed in an electrodeposition apparatus with a clean linished bare steel panel serving as a cathode. Current was made to flow for 26 minutes at an average rate of 5.6 mA/cm$^2$ while the composition mixture was maintained at 30° C.

The cathode was removed, rinsed and stoved at 175° C. for 30 minutes. It was found that a coating had been formed that was 72 g/m$^2$ in total of which 87% comprised polymer by weight. The residual 13% was metal deposit which comprised 1.1% by weight of cobalt in a cobalt-zinc total metal deposit.

(vi) Salt Spray Corrosion Testing

A similar panel, where dual cobalt-zinc alloy and film-forming polymer material had been co-deposited as above in item (v), was scribed and placed in a saltspray cabinet along with a "control panel", similarly scribed where the deposit consisted for only the film forming material i.e. where the metal plating component was omitted to serve as a reference. The panels were tested for 14 days as according to the specification described in ASTM-B117. On removal from the test cabinet it was found that the control panel showed 8 mm undercutting of the film from the scribe mark; while the panel with the dual cobalt-zinc alloy and film-forming polymer had virtually no undercutting from the scribe mark.

EXAMPLE 15

(i) Preparation of Film-Forming Polymer

A 10 liter flask fitted with a Dean & Stark separation head was charged with Epikote 1001 (4516 parts), (Epikote 1001 is a registered Trade Mark of Shell Chemicals) polycaprolactone diol PLP0200 (Ex Union Carbide) (1134 parts) and methyl isobutylketone (771 parts). The mixture was heated to reflux and any water present was removed. When all the fortuitous water was removed 14.7 parts of dimethyl benzylamine were added and the temperature was found to be 145° C. After approximately 2 hours the epoxy value had dropped to 1056 micro gram equivalents per gram non-volatile from the corresponding initial value of 1495.

675 parts of the mono-methyl ether of a poly(ethylene glycol) of approximately 2000 molecular weight were added and the temperature was maintained at 145° C. until the epoxy value dropped to 376 microgram equivalents per gram non-volatile. Then, a further 1926 parts of methyl isobutylketone were added give a resin solution of 70% solids (ii) Preparation of Film-Forming Material To the resin prepared in (i) (414 parts), diethanolamine (11.6 parts) was added and the mixture was heated to 70° C. with stirring until the epoxy value was found to have dropped to 18.5 μg./gram. Benzyl chloride (15 parts) was then added: the temperature was increased to 100° C. and maintained for a further 4 hours On cooling to room temperature Uravar-L9 (122 parts) was added to give a clear resin blend.

(iii) Emulsification

The resin blend from (ii) above was emulsified in a 5% solution of butyl cellosolve in deionised water using a high speed stirrer ("Ystral Homogeniser"), to produce a fine stable emulsion of 13% solids, and with a critical coalescence value of −0.62.

(iv) Preparation of dual metal plating and organic film-forming composition

To 500 parts of the emulsion prepared in (iii) above, 31.05 parts of the zinc solution described in Example 1 (i) were stirred in. The resulting composition had a pH of 7 and comprised 0.38% by weight of zinc. The critical coalescence temperature of the composition was 59° C.

(v) Electrodeposition

The composition (iv) above, was warmed to 30° C. and placed in a clean electrodeposition cell where a clean linished bare steel panel served as the cathode. An average current density of 5.8 mA/cm$^2$ was applied for 26 minutes The panel was then rinsed, dried and stoved at 175° C. for 30 minutes.

It was found that 128 g/m$^2$ of material had been deposited of which 4% by weight comprised zinc.

EXAMPLE 16

(i) Preparation of Film-Forming Material

The resin prepared in Example 15 (i) (553 parts) and benzoic acid (14 parts) was heated at reflux for 6.5 hours so that the final epoxy value was 80 microgram equivalents per gram non-vol. Diethanolamine (2.51 parts) was added and the mixture was heated until the epoxy value was negligible. Benzyl chloride (4.51 parts) was added and the resin was maintained at 100° C. for 4 hours. The resin was cooled and Uravar-L9 (160 parts) was added and mixed in.

(ii) Emulsification 400 parts of a 5% butylcellosolve solution were used to emulsify the appropriate amount of the polymer (i) above to give a 13% solids oil-in-water emulsion. The emulsion had a critical coalescence value of −0.62.

(iii) Preparation of Dual Metal Plating and Organic Film-Forming Composition

To the emulsion prepared in (2) above, 500 parts of the zinc salt solution described in Example 1 (i) 31 parts was stirred in. The critical coalescence temperature of the mixture wa 60° C.

(iv) Electrodeposition

The composition described in (3) above was warmed to 30° C. and placed in a suitable electrodeposition cell where a clean, bare steel panel served as a cathode. An average current density of 6 mA/cm$^2$ was applied for 26 minutes. The panel was removed, rinsed dried and stoved at 175° C. for 30 minutes. On analysis it was found that 185 g/m$^2$ had been deposited of which 6.5% g/m$^2$ was zinc metal.

EXAMPLE 17

(i) Preparation of Dual Metal Plating and Organic Film-Forming Composition

To the emulsion prepared in Example 6 (ii), 500 parts of the 'Analar' grade zinc nitrate hexahydrate 198 parts was added to give a solution of 6.2% zinc ions on the total composition. The critical coalescence temperature of the composition was found to be 46° C.

(ii) Electrodepostion

The composition described in (i) above was warmed to 28° C. and placed in a suitable electrodeposition cell where a clean, bare steel panel served as a cathode. An average current density of 8 mA/cm was applied for 15 minutes. The panel was removed, rinsed, dried and stoved at 175° C. for 30 minutes. On analysis it was found that 57 g/m had been deposited of which 42% was zinc.

We claim:

1. A process for coating an article simultaneously with a metal and a film-forming polymer which comprises passing an electric current at a current density of 1 to 35 milliamps $cm^{-2}$ between the article as a cathode and a counter-electrode immersed in an aqueous coating composition having an inherent pH of 2.5 to 9.5, comprising:
   (a) an emulsion in an aqueous carrier of film-forming polymer selected from the group consisting of epoxy resins, alkyd resins, polyurethane resins, acrylic resins and polyester resins having steric stabilizing units comprising a non-ionic hydrophilic moiety derived from a polymer which comprising repeating oxyethylene units of molecular weight between 1,000 to 2,500 and being free from ionic stabilizing units, the emulsion being one which has a critical coalescence value more negative than $-0.3$ units, and
   (b) at least 0.06% by weight based on the total composition of one or more zinc, cadmium, cobalt, iron or nickel salts such that the emulsion has a critical coalescence temperature of 35° to 95° C.

2. A process according to claim 1 in which the film forming polymer is an epoxy resin.

3. A process according to claim 1 in which the component (b) comprises an amount of one or more zinc, cadmium, cobalt, lead or nickel.

4. A process according to claim 1 in which the current density between the article as cathode and the counter electrode is between 1 and 30 $mAcm^{-2}$.

5. A process according to claim 4 in which the current density is between 3 and 25 $mAcm^{-2}$.

6. A process according to claim 1 in which the inherent pH of the composition is 4 to 9.5.

7. A process according to claim 1 in which the metal ion is present in the composition in an amount of less than 10% by weight.

8. A process according to claim 1 in which the conductivity of the composition is from 500 to 80,000 microSiemens per centimeter.

9. An aqueous coating composition having an inherent pH of 2.5 to 9.5 comprising:
   (a) an emulsion in an aqueous carrier of a film-forming polymer selected from the group consisting of epoxy resins, alkyd resins, polyurethane resins, acrylic resins and polyester resins, having steric stabilizing units comprising a non-ionic hydrophilic moiety derived from a polymer which comprises repeating oxyethylene units of molecular weight between 1,000 to 2,500 and being free from ionic stabilizing units the polymer being one which has a critical coalescence value more negative than $-0.3$ units, and
   (b) as the metal ions, an amount of one or more zinc, cadmium, cobalt, iron, tin, nickel or copper salts such that the emulsion has a critical coalescence temperature of 35° to 95° C.

10. A coating process which comprises the steps of:
    (i) coating an article simultaneously with a metal and a film-forming polymer by the process according to claim 1, and thereafter;
    (ii) stoving the coated article.

11. A coating process which comprises the steps of:
    (i) coating an article simultaneously with a metal and a film-forming polymer by a process according to claim 1,
    (ii) stoving the coated article, and thereafter,
    (iii) applying a topcoat.

* * * * *